United States Patent [19]
Gallant

[11] Patent Number: 5,220,729
[45] Date of Patent: Jun. 22, 1993

[54] HAND-HELD WIRE SAW

[76] Inventor: Raymond J. Gallant, 12 Thomas St., Windham, N.H. 03087

[21] Appl. No.: 923,517

[22] Filed: Aug. 3, 1992

[51] Int. Cl.⁵ .................. B28D 1/08; B27B 13/06
[52] U.S. Cl. ........................ 30/380; 30/371; 51/170 EB; 125/21
[58] Field of Search ............ 30/371, 380; 51/170 PT, 51/170 EB, 170 R; 125/13.01, 15, 21; 83/651.1, 788, 820

[56] References Cited

U.S. PATENT DOCUMENTS

| | | | |
|---|---|---|---|
| 3,621,894 | 11/1971 | Niksich | 30/380 |
| 4,484,502 | 11/1984 | Ebnes | 125/21 |
| 4,491,047 | 1/1985 | Butkiewicz et al. | 30/380 |
| 4,576,139 | 3/1986 | Cogswell | 125/21 |
| 4,766,875 | 8/1988 | Feigelson | 125/21 |
| 4,832,411 | 5/1989 | Johnston et al. | 125/21 |
| 4,854,296 | 8/1989 | Pittet | 83/788 |
| 4,893,607 | 1/1990 | Kubo | 125/21 |
| 4,903,682 | 2/1990 | Kurokawa | 125/21 |
| 4,907,564 | 3/1990 | Sowa et al. | 125/21 |
| 4,915,000 | 4/1970 | MacFarlane | 125/21 |

Primary Examiner—Douglas D. Watts
Assistant Examiner—Hwei-Siu Payer
Attorney, Agent, or Firm—David Fink

[57] ABSTRACT

A hand-held power saw has a main housing and two guide housings telescopically interactive with the main housing and having facing open distal extremities. A motor and associated drive pulley are associated with the main housing. Paired idle and alignment rollers are disposed within the guide housings. An endless abrasive wire rope is centrally disposed within the main and guide housings in contact with the drive pulley and paired rollers. The region of the wire rope extending between the facing distal extremities of the guide housings is employed to cut a workpiece.

8 Claims, 3 Drawing Sheets

HAND-HELD WIRE SAW

BACKGROUND OF THE INVENTION

1. Field of the Invention

This invention relates to power tools, and more particularly concerns a hand-held power saw employing a continuous abrasive wire rope cutting element.

2. Description of the Prior Art

Numerous abrasive wire or cord cutting devices have been disclosed in the prior art. Various abrasive wire saws have been employed in the cutting of concrete, stone, steel and other materials. For example, U.S. Pat. No. 4,907,564 to Sowa, et al., discloses a wire rope surrounded by a plurality of abrasive sleeves which are spaced apart at predetermined intervals longitudinally of the wire rope. In the form of a closed loop, the wire rope is advanced around rollers while urged against a workpiece.

U.S. Pat. No. 4,766,875 to Feigelson discloses a device employing an endless wire which carries a slurried abrasive cutting material such as silicon carbide particles. The device is designed to deposit and recover the cutting particles and recirculate them for use upon the wire. This is a large and complex apparatus which relies upon pressure exerted upon the wire by weights to achieve a cutting effect.

U.S. Pat. No. 4,832,411 to Johnston, et al., relates to a method of cutting an interior surface in reinforced concrete. In this process, holes are drilled to define the shape of concrete to be removed. Slots are then cut between the holes using an endless wire saw. The wire saw is secured in the cutting operation at the interior end of the holes by swivel pulleys secured at the exterior end of the holes to the concrete surface. Apparatus which drives the saw is complex and requires an elaborate set up process as well as drilling equipment.

Other wire rope cutting saw devices are disclosed in U.S. Pat. Nos. 4,903,682 to Kurokawa, 4,893,607 to Kubo, and 4,484,502 to Abner. These devices, although well adapted to the intended purpose of cutting large blocks of stone, concrete or similar materials, suffer from the common limitations imposed by the size and complexity of the apparatus. The Kubo and Kurokawa devices utilize an endless wire loop secondary rotating circuit cutting means driven by a primary rotating circuit loop. The complexity of the drive systems preclude their use in small hand-held cutting implements. The Abner device discloses a system in which a non-continuous segment of abrasively coated wire rope is reciprocally drawn between two rotating motorized drums. This device also is not amenable to use in a hand-held cutting implement.

It is therefore an object of the present invention to provide a continuous endless abrasive wire rope cutting device amenable to use in hand-held implementation.

It is another object of the present invention to provide a device of the aforesaid nature which is compact, light-weight and simple in construction.

Further objects of this invention are to provide a device of the aforesaid nature which is durable, safe, and amenable to low cost manufacture.

These and other beneficial objects and advantages will be apparent from the following description.

SUMMARY OF THE INVENTION

The above and other beneficial objects and advantages are accomplished in accordance with the present invention by a motorized cutting device amenable to use in hand-held implementation, said device comprised of:

a) a main housing of substantially uniform cross-sectional configuration having two co-directionally facing open extremities, b) paired guide housings elongated between open proximal and distal extremities, said proximal extremities slidably entering the open extremities of said main housing in a manner to permit longitudinal positioning of said guide housings with respect to said main housing, said distal extremities being spaced apart in substantially facing juxtaposition, c) a motor associated with said main housing and having a drive shaft orthogonally penetrating said housing, d) a drive pulley wheel fixedly associated with said drive shaft and disposed within said main housing, e) a plurality of round idler rollers positioned within said guide housings upon spindles journaled to said guide housings, said idler rollers disposed in coplanar relationship with said drive pulley wheel, f) an alignment roller associated with each idler roller in close conformity therewith and rotatively journaled to said guide housing, g) an endless abrasive wire rope which passes centrally through said main housing about said drive pulley wheel and thence passes between said idler and alignment rollers in a circuitous path, h) rotatable support bearing means associated with each facing distal open extremity and adapted to rotatably engage said wire rope to prevent deflection of said rope with respect to central passage through said main and guide housings, i) handle means fixedly associated with said main housing, and j) an activation switch and power cord adapted to energize said motor.

In a preferred embodiment, the idler rollers, drive pulley, and alignment rollers are constructed from or coated with a resilient rubber or vinyl material. One or more of said roller pairs may be positionable and spring-biased toward the wire rope in order to provide constant tension on the wire rope. The motor is preferably electrically powered, but may be driven by other means such as compressed air, battery pack or gasoline engine. Variable speed control may be provided by a rheostatic switch. The main and guide housings may be constructed from lightweight plastics or from cast aluminum.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
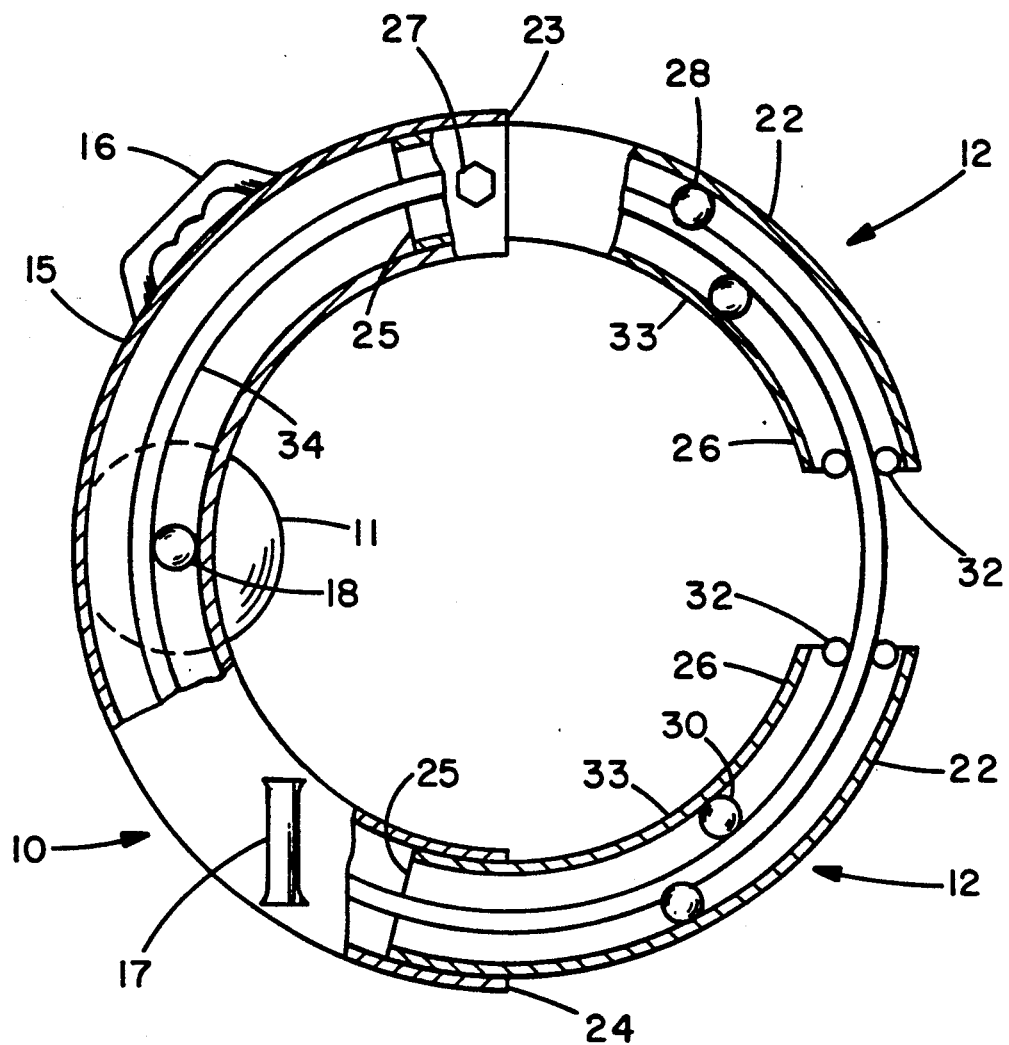
FIG. 1 is a side view, partly in section, of an embodiment of the cutting device of the present invention.
Figure 2:
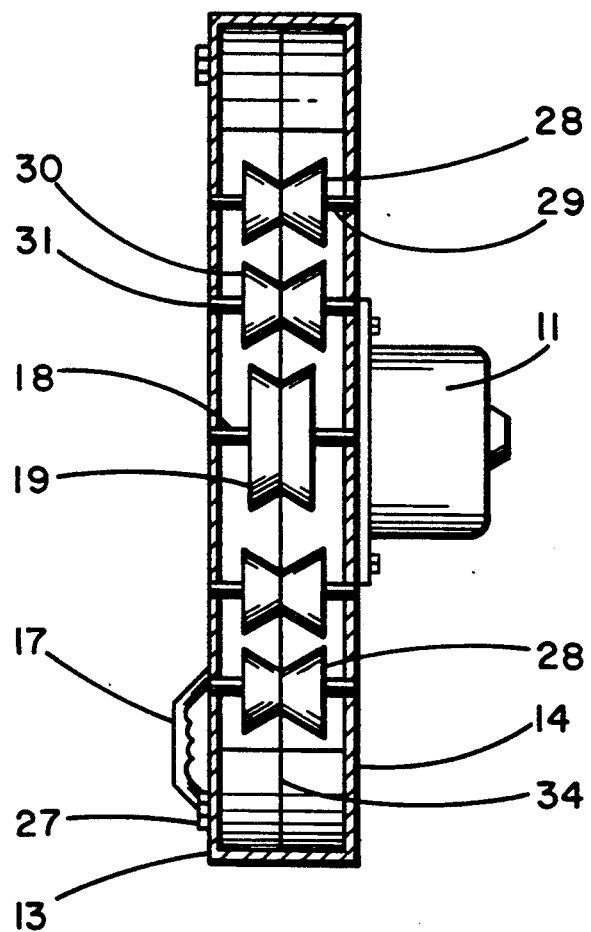
FIG. 2 is a front view of the embodiment of FIG. 1 with portions broken away to reveal interior detail.
Figure 3:
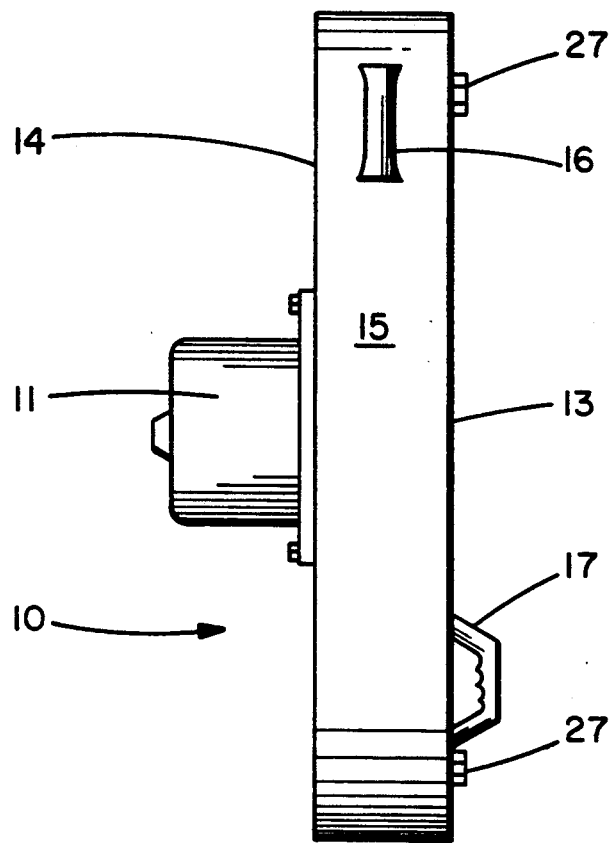
FIG. 3 is a rear view of the embodiment of FIG. 1.
Figure 4:
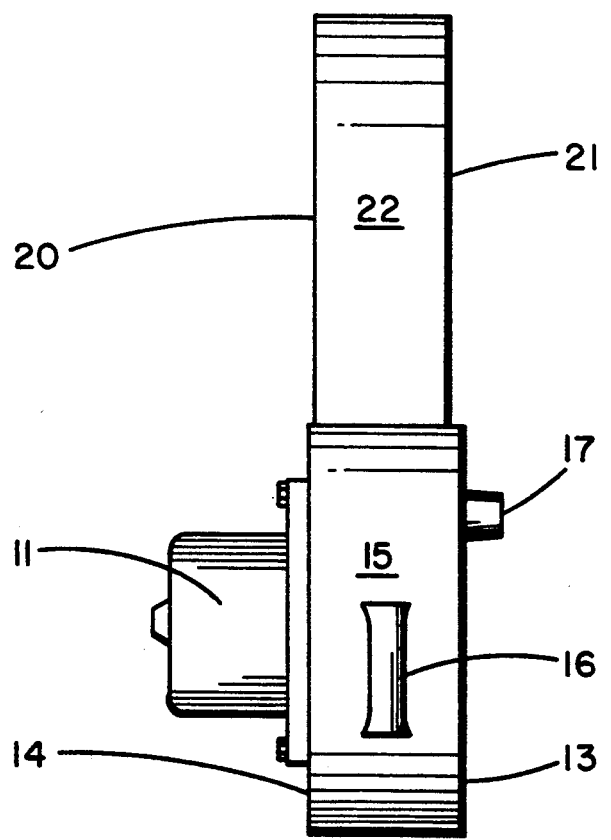
FIG. 4 is a top view of the embodiment of FIG. 1.

Referring to FIGS. 1-4, an embodiment of the cutting device of the present invention is shown comprised of main housing 10 having attached motor 11, and paired guide housings 12 slidably interactive with said main housing.

The exemplified embodiment of main housing 10 is comprised of opposed flat sidewalls 13 and 14 of arcuate shape joined by curved back or outside panel 15. The cross-sectional configuration is of substantially U-shape and is constant throughout. In other embodiments, a front or inside enclosing panel may additionally be utilized, thereby forming a more complete enclosure of tubular nature. The housing may be fabricated of several assembled components, or may be of monolithic structure, fabricated of metal or plastic by a molding or extrusion operation. Upper and lower extremities, 23 and 24, respectively, are open.

Upper and side handles 16 and 17, respectively, are attached to curved panel 15 and sidewall 13 respectively. Their placement facilitates secure holding and manipulation of the saw device.

Motor 11 is attached to sidewall 14. Shaft 18, emergent from said motor, penetrates sidewall 14 and is supportively journaled to both sidewalls.

Drive pulley wheel 19 is orthogonally affixed to said shaft, and centrally positioned between said sidewalls.

The exemplified embodiments of guide housings 12 are each comprises of flat sidewalls 20 and 21 joined by curved front and outside panel 22. The cross-sectional configuration is of substantially U-shape and is constant throughout. In other embodiments, a rear or inside enclosing panel may additionally be utilized, thereby forming a more complete enclosure of a tubular nature. Each guide housing has open proximal and distal extremities 25 and 26, respectively. The curvature and cross-sectional dimensions of the guide housings are such that proximal extremities 25 telescopically slide within the extremities of main housing 10. Distal extremities 26 are in substantially facing relationship. Locking bolts 27 are utilized to secure the position of the guide housing with respect to the main housing. In alternative embodiments, the slidably telescopic interaction may be achieved wherein the main housing fits within the guide housings.

Idler wheels 28, disposed upon spindles 29 journaled to said sidewalls, are in coplanar disposition with respect to the center of pulley wheel 19. An alignment roller 30, held by spindles 31 journaled to said sidewalls, is positioned closely adjacent each idler wheel and coplanar therewith. At least one such combination of idler wheel and alignment roller is present in each guide housing, and possibly also in said main housing.

Paired parallel rotatable support bearing rods 32 are journaled to said sidewalls at each distant extremity. The spacing between said bearing rods is such that they are equidistantly separated from the midline of the sidewall, namely an arcuate line positioned midway between outside panel 22 and inside edge of panel 33.

Endless abrasive rope 34 travels centrally through said main and guide housings. It is driven by frictional contact with drive pulley wheel 19, and is constrained to a central path by passage between and interaction with said idler wheel/alignment roller combinations. At its point of emergence from the distal extremities of the guide housings, rope 34 is constrained to central positioning by virtue of bearing rods 32. Accordingly, whether the rope is pulled against a workpiece disposed within the loop of the rope or pushed against a workpiece disposed outside the loop, bearing rods 32 maintain proper positioning.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A cutting device comprising:

a housing comprising a main portion enclosing said predetermined path and defining open regions, and a secondary portion slidably connected to one end of said main portion and operable for telescopically being moved to vary the size of the open region, selectively;

an endless abrasive wire rope positioned in said housing for being moved relative said housing around a predetermined path;

whereby, the open region can be used for contacting an object to be cut by said device;

rolling means connected to said housing and operable for constraining said wire rope along said predetermined path both when said wire rope is stationary relative said housing and when said wire rope is moving relative said housing;

said rolling means comprising a plurality of rollers journaled for rotation relative said housing and positioned on opposite sides of said wire rope;

driving means connected to said housing and operable for engaging and for moving said wire rope relative said housing along said predetermined path; and holding means forming a part of said housing for holding said device during its use for cutting a predetermined object.

2. The cutting device as claimed in claim 1, wherein said driving means comprises a motor.

3. The cutting device as claimed in claim 1, wherein said rolling means further comprises spring biased means for urging at least one of said rollers towards said wire rope to maintain tension in said wire rope.

4. The cutting device as claimed in claim 1, wherein said holding means comprises handles connected to said housing.

5. The cutting device as claimed in claim 1, wherein said driving means comprises a drive pulley for engaging said wire rope for moving said wire rope relative said housing.

6. The cutting device as claimed in claim 1, wherein said predetermined path is generally circular.

7. The cutting device as claimed in claim 1, wherein said said main portion and said secondary portion join together to define a generally uniform open region through which said predetermined path is defined.

8. The cutting device as claimed in claim 1, further comprising another secondary portion slidably connected to the other end of said main portion and operable for telescopically being moved to vary the size of the open region, selectively.

* * * * *